(12) United States Patent
Kumar et al.

(10) Patent No.: US 7,676,096 B2
(45) Date of Patent: Mar. 9, 2010

(54) MODULAR, LOW COST, MEMORY EFFICIENT, INPUT RESOLUTION INDEPENDENT, FRAME-SYNCHRONOUS, VIDEO COMPRESSION SYSTEM USING MULTI STAGE WAVELET ANALYSIS AND TEMPORAL SIGNATURE ANALYSIS WITH A HIGHLY OPTIMIZED HARDWARE IMPLEMENTATION

(75) Inventors: B. Anil Kumar, Saratoga, CA (US); Frank Palita, Goodyear, AZ (US); Paul Lessard, Palo Alto, CA (US); Victor Ramamoorthy, Pleasanton, CA (US)

(73) Assignee: QformX, Palo Alto, CA (US)

( * ) Notice: Subject to any disclaimer, the term of this patent is extended or adjusted under 35 U.S.C. 154(b) by 1156 days.

(21) Appl. No.: 11/178,212

(22) Filed: Jul. 8, 2005

(65) Prior Publication Data
US 2007/0009165 A1  Jan. 11, 2007

(51) Int. Cl.
*G06K 9/34* (2006.01)
*G06K 9/36* (2006.01)
*G06K 9/46* (2006.01)
*H04N 7/12* (2006.01)
*H04N 11/02* (2006.01)
*H04N 11/04* (2006.01)

(52) U.S. Cl. .................. 382/232; 382/164; 382/166; 382/240; 375/240.01; 375/240.02

(58) Field of Classification Search .............. 382/164, 382/166, 173, 232, 240; 375/240.01, 240.02, 375/240.03
See application file for complete search history.

(56) References Cited

U.S. PATENT DOCUMENTS

| 7,050,641 B1 * | 5/2006 | Kharitonenko ............ 382/240 |
| 2005/0196060 A1 * | 9/2005 | Wang et al. ................. 382/240 |

* cited by examiner

*Primary Examiner*—John B Strege
(74) *Attorney, Agent, or Firm*—Pillsbury Winthrop Shaw Pittman LLP (57) ABSTRACT

The present invention provides a method of and apparatus for operating upon a sequence of video frames by splitting each frame into components, and each component into a plurality of columns. The columns are operated upon in a manner that reduced edge artifacts and compresses the columns by reducing precision in certain higher frequency bands more than other lower frequency bands. The thus operated upon frames can be transmitted, received, and processed at a receiver with low latency and very low memory storage The invention further discusses a novel way of temporal compression using signatures of the sub bands generated for spatial compression. Spatial analysis using wavelets further enables the decoder to format and scale the decoded output to suit an arbitrary display screen. The method provides a practical solution to the problem of compressing, storing, or transmitting of video with ever-increasing spatial and temporal resolutions.

19 Claims, 8 Drawing Sheets

Forward Spatial Transform

FIG. 4a

Reverse Spatial Transform

FIG. 4b

Multi-stage Forward Spatial Transform

FIG. 4c

Multi-stage Reverse Spatial Transform

MODULAR, LOW COST, MEMORY EFFICIENT, INPUT RESOLUTION INDEPENDENT, FRAME-SYNCHRONOUS, VIDEO COMPRESSION SYSTEM USING MULTI STAGE WAVELET ANALYSIS AND TEMPORAL SIGNATURE ANALYSIS WITH A HIGHLY OPTIMIZED HARDWARE IMPLEMENTATION

FIELD OF THE INVENTION

The present invention relates to a method of and apparatus for encoding video frame images for transmission and subsequent reception with low latency. In particular, the present invention relates to a modular, low cost, memory efficient, input resolution independent, frame-synchronous, video compression system using multi stage wavelet analysis and temporal signature analysis with a highly optimized hardware implementation.

BACKGROUND OF THE INVENTION

Today it is possible to capture a high-resolution image sequence with multi-million pixels. Even inexpensive digital cameras have a picture resolution of 3-5 million pixels. Current specifications of digital cinema standards define input frame size of 4096×2180 pixels with 36-bit color palette. It is quite conceivable that in the near future, the technology will be capable of capturing 16 to 48 million pixels with full color.

With increases in spatial resolution, the data size of individual frame increases dramatically. Current processor technologies are not likely to have quantum improvements in terms of clock cycle or memory sizes that are needed to handle the increased resolution of image sequences. The need for alternative architectures to handle exponential increase in data from image sensors is immediate and highly desired.

SUMMARY OF THE INVENTION

The present invention provides a method of and apparatus for encoding video frame images for transmission and subsequent reception with low latency.

In a preferred embodiment, the present invention provides a method of operating upon a sequence of video frames by splitting each frame into components, and each component into a plurality of columns. The columns are operated upon in a manner that reduced edge artifacts and compresses the columns by reducing precision in certain higher frequency bands more than other lower frequency bands. The thus operated upon frames can be transmitted, received, and processed at a receiver with low latency and very low memory storage. The invention further describes a novel way of temporal compression using signatures of the sub bands generated for spatial compression. Spatial analysis using wavelets further enables the decoder to format and scale the decoded output to suit an arbitrary display screen. The method provides a practical solution to the problem of compressing, storing, or transmitting of video with ever-increasing spatial and temporal resolutions.

While described in the context of a video system, the present invention has aspects that are applicable to operations on a data set, and particularly and ordered data set, and more particularly an ordered data set in the form of an image.

BRIEF DESCRIPTION OF THE DRAWINGS

The above and other objects of the present invention will become readily apparent when reading the following detailed description taken in conjunction with the appended drawings in which.

DETAILED DESCRIPTION OF THE PREFERRED EMBODIMENTS

The following detailed description sets forth the preferred embodiments of the present invention. These embodiments, however, will be better understood with the following background. This background, while including certain information that is, when viewed separately, known in the art, together provides other information that is not believed to be known in the art.

Background

Video signals can have many different spatial and temporal resolutions. Spatial resolution refers to how many pixels are contained in a frame. With the current sensor technology, it is not difficult to design a camera sensor to have 4096 pixels in the X direction and 2180 pixels in the Y direction in each frame. Each pixel typically has 3 primary colors called as color components. It is very likely that more color components are available in the next generation of camera sensors. It is useful to think of components in a general sense: a component can mean color information such as R, G, B or Y, M, C, K; it can also mean a layer of image that has special significance such as shape information which will be important in overlays of images. This means that each pixel in a single frame has three or more color component values represented as a digital word. The length of this digital word is an indication of how accurately color in each pixel is captured. A typical high-end camera can have as many as 48 or more bits to represent color in each pixel.

Combining all, a single frame with X pixels in the horizontal direction and Y pixels in the vertical direction with Z bits of color representation per pixel will have $X \cdot Y \cdot Z$ bits. Alternatively if there are $N_C$ (color or shape) components each having $Z_C$ bits per color component, then the number of bits contained in the frame is $X \cdot Y \cdot N_C \cdot Z_C$ bits. In other words, there are $N_C$ (color or shape) components each with $X \cdot Y \cdot Z_C$ bits.

A video is a sequence of frames captured by sampling in time. If the camera sensor can produce F frames/sec, then the data generated by the sensor is $X \cdot Y \cdot Z_C \cdot N_C \cdot F$ bits/sec. Notice that all the five quantities, X, Y and F keep increasing with improvements in sensor technologies and silicon processing technologies. The two other quantities are not likely to increase dramatically in the near future. Nevertheless, the data issuing from the camera sensors keep increasing significantly and the designs made for one particular set of above parameters will not work for others. The crucial aspect of this problem is that (a) the working memory required for storing temporary results becomes large and expensive and (b) the processing elements have to run faster to meet the real-time constraints leading to complex designs and high power consumption.

A modular architecture is required to manage this ever-increasing video date rate because of improvements in sensor construction technologies from lower to high spatial, temporal, and color resolution. To be of use, this high data rate has to be compressed without losing visual quality. It is also possible to compress data without losing any data integrity.

Another element of compression systems is the encoding delay arising in the compression pipeline. Since compression device needs to collect a minimum amount of data to process the input, the encoding invariably results in a delay between the transmitter device and the receiver device. Again, the delay encountered is decided by the working memory in the processing pipeline. If the compression algorithm demands a large amount of data storage in the working memory for achieving better compression, the compression algorithm may be undesirable in a real-time application that cannot tolerate a large encoding delay. Today there are algorithms that do not introduce significant encoding delay and yet render good quality in the compressed data. For these algorithms to perform, the data has to be fed and processed in a timely manner—which means faster clock speeds in the processing.

The best way to manage the current dilemma is to design a data partitioning approach where the input is divided into smaller groups where independent parallel units can work simultaneously. This parallel approach has the advantage of not requiring increased clock speed or complex process technology. If the division of work also results in smaller temporary memories, it will also have the cost advantages. The disadvantages may be (a) introduction of artifacts because of partitioning and (b) loss of compression advantage because of smaller work memory. In this invention, it is shown that extra signal processing and the choice of compression strategy effectively remove both of these disadvantages.

Column Splitting and Joining

In one aspect, the present invention is directed to a manner of preprocessing an input video signal and splitting each of the frames into multiple vertical columns for transmission, and, at a receiver, then joining the previously split columns back together. The term "column" is used interchangeably to mean a vertical stripe of input image.

Figure 1:
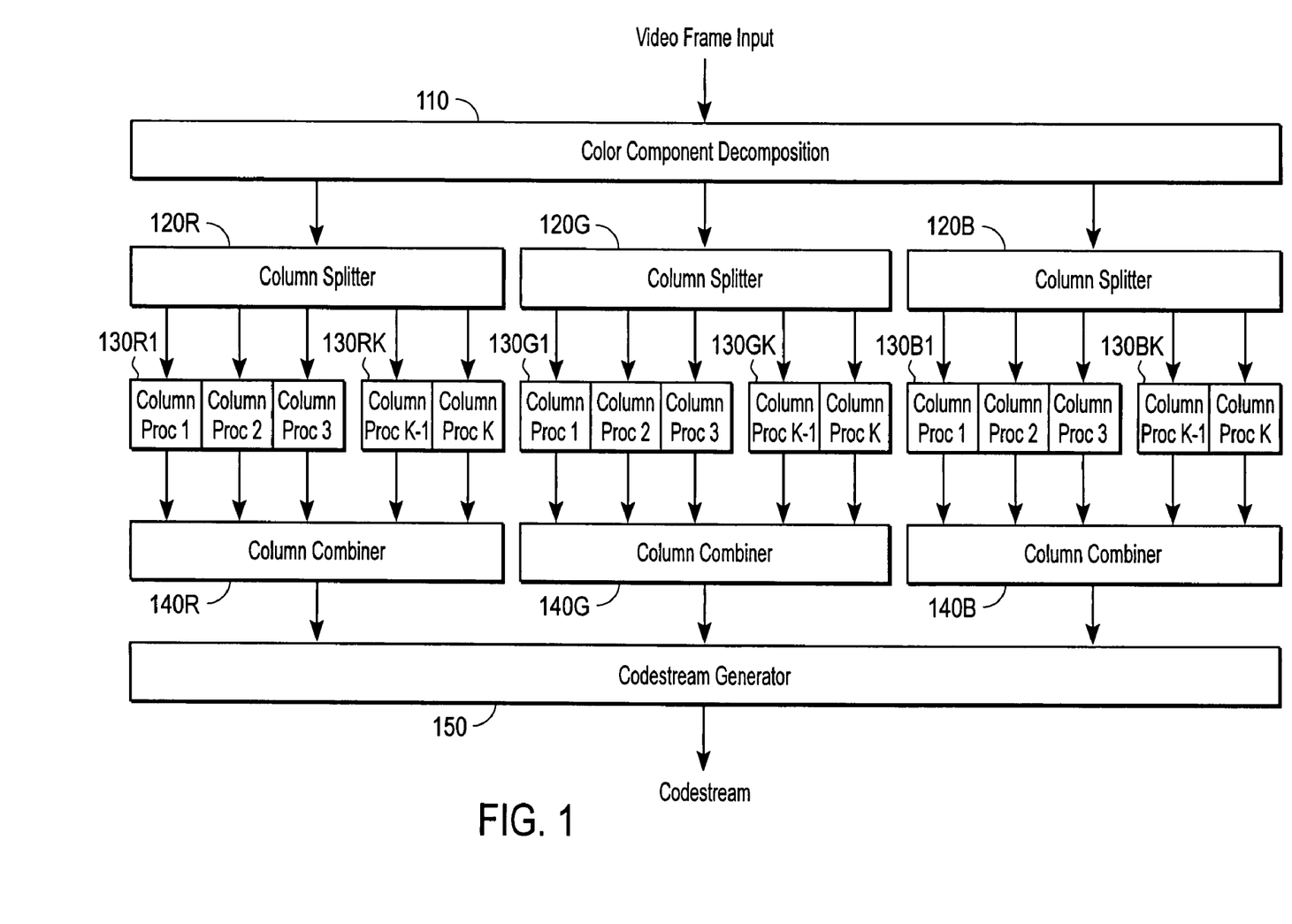
FIG. 1 illustrates a simplified transmitter functional diagram according to the present invention.

A frame splitter 100, illustrated in FIG. 1, provides the splitting function. The frame splitter 100 generates vertical stripes of the input, which can then be separately identified and combined into a code stream, in the following manner.

Given the input video 10 with the parameters $\{X, Y, F, N_C, Z_C\}$ defined earlier, different components are separated using a component separator 110, which can provide, for example, color component decomposition. From each component output of the component separator 110, a column splitter 120, such as component splitters 120-R, 120-G and 120-B as shown, generates K columns with parameters: $\{(X \cdot \alpha_1), Y, F, N_C, Z_C\}$, $\{(X \cdot \alpha_2), Y, F, N_C, Z_C\}$, $\{(X \cdot \alpha_3), Y, F, N_C, Z_C\}$, ... $\{(X \cdot \alpha_K), Y, F, N_C, Z_C\}$ where $0 \leq \alpha_i \leq 1$ and $$\sum_i a_i = 1.$$

In this general setup, each column width is upper bounded by the width of the input. The sum of all column widths adds up to the input width. Though it is easy to set $\forall \alpha_i = 1/K$ and hence make the column widths equal, it is not necessary. With this arrangement, configuring the column splitters 120 and feeding the output of each of the column splitters 120 to an associated individual column processor 130, shown as column processors 130-R1 to Rk, 130-G1 to Gk, and 130-B1 to Bk, allows the frame splitter 100 to handle any video resolution, merely by adding more column processors 130 in parallel. Parallel processing of all the columns happen simultaneously.

A low-resolution input may need a single or small number of column processors 130 while a high resolution may need many column processors 130 operating in parallel.

A column processor 130 is a basic unit that can be implemented in a single chip (system) or multiple chips. The column splitter 120, the column processors 130, and the column combiners 140 are configurable units and form the basic architecture of the entire system.

There are at least two different ways of implementing the frame splitter 100. In one configuration, as illustrated in FIG. 1, the frame splitter 100 operates in the video signal space. That is, the frame splitter 100 operates on individual color or shape components. The input video is first decomposed into $N_C$ color components. In the second configuration, not shown, the components are already separated and are available as a separate input. Hence, the decomposition of components is not necessary. If the color primaries happen to be Red, Blue and Green, then there will be three-color components to begin with. The RGB components or equivalent YUV components—using the well known color space transformation—for the basis for the first level of decomposition. Then each component is separately fed to a column splitter 120, which divides the input into many vertical stripes called columns. A separate column processing unit 130 handles each of the columns. Hence a total of $K \cdot N_C$ separate column processors 130 operate in parallel. The output of each of the processing units 130 can be combined using a column combiner 140, shown as column combiners 140R, 140G, and 140B, together to form the coded bit stream, which can multiplexed together using a code stream generator 150, which can be implemented as a multiplexor, for example, such that the codestream can then be transmitted or stored in a medium for subsequent transmission.

Figure 2:
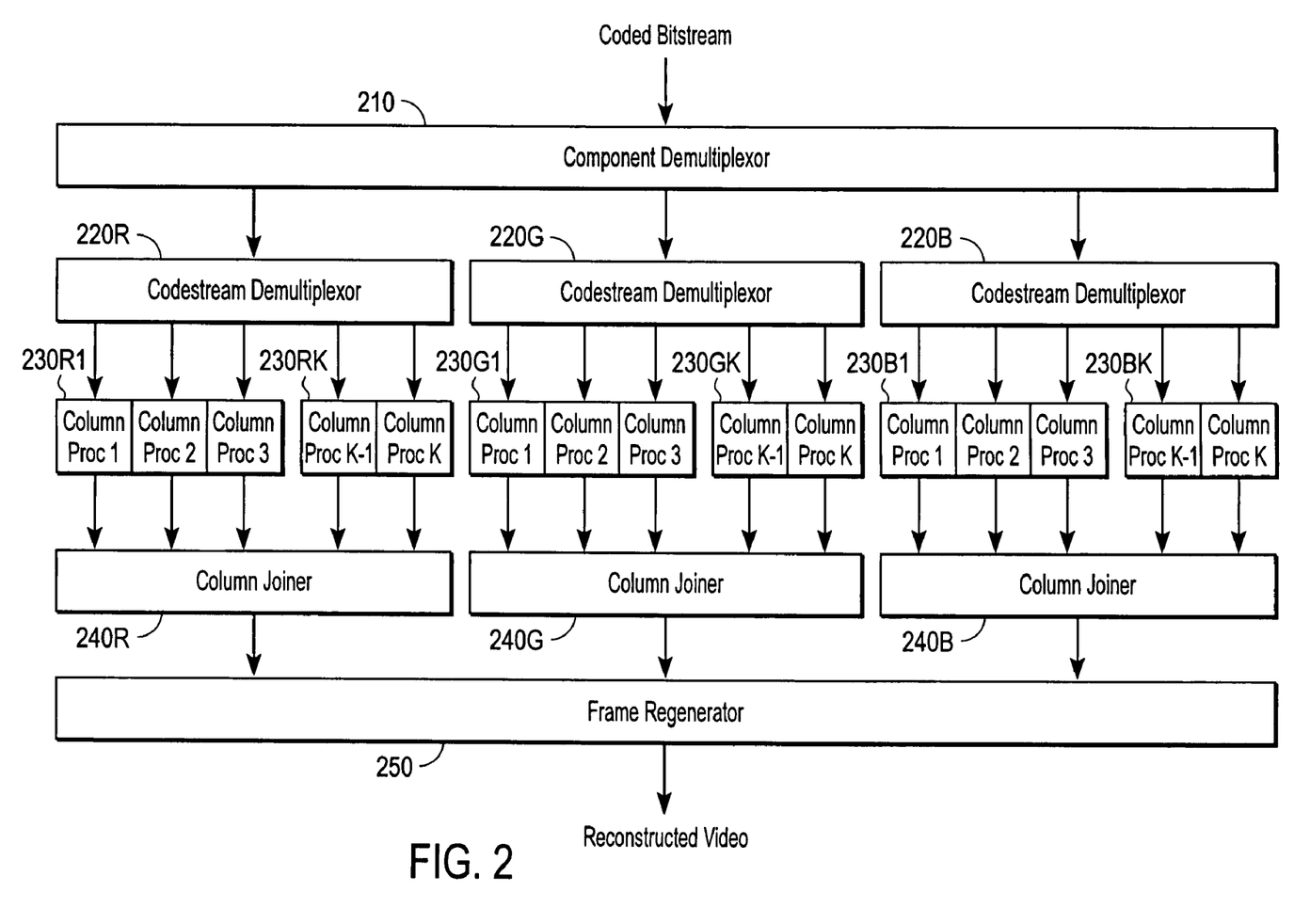
FIG. 2 illustrates a simplified receiver functional diagram according to the present invention.

As illustrated in FIG. 2, at the other end, a receiver 200 receives the bit stream and a component demultiplexer 210 separates the bit streams corresponding to each column, and feeds each stream to a separate codestream demultiplexer 220, shown as 220R, 220G and 220B, which each separate each component into separate columns. Each separated column is then decoded within a corresponding column decoding processing unit 230, which are shown as decoding processors 230-R1 to Rk, 230-G1 to Gk, and 230-B1 to Bk. The column decoding processor units 230 retrieve the compressed columns and send the output to a corresponding column joiner module 240, shown as 240R, 240B and 24B, for that component. The column joiner 240 is the inverse of the column splitter 120 described previously. The column joiner 240 reproduces the video with the same parameter setup as that of the input. The different components are thereafter combined using a frame regenerator 250, which is essentially the inverse of the component separator 110.

Column Encoding

The columns generated by each of the column splitters 120 can be treated as though they were independent images though there is the requirement that all the columns retrieved at the receiver 200 must join together without any artifacts at the "seams" or at the edges where the column separation happens. This seamless stitching of columns is an important part of the encoding strategy. There are many coding algorithms, which do not lend themselves to this requirement. For example, any algorithm based on Discrete Cosine Transform shows the artifacts at the seams. This is well known in the coding literature as "blocking" artifact. In high resolution, high quality applications, blocking artifacts are unacceptable. The preferred method of encoding in such circumstances is the pyramidal coding using spatial sub band filtering techniques.

If other spatial transformations are to be done on the columns, it is necessary to have signal extensions included prior to the generation of coded bit streams. This means that the columns generated will have some extra width or "borders" to include the signal in the adjacent columns, as described hereinafter with reference to FIG. 3. In this way, though the columns are processed individually, the boundaries of columns still contain the knowledge to reconstitute the input video signal at the receiver end. If the column boundaries are not properly treated, there will be visible degradations at the column boundaries of the reconstructed signal. Once the columns are generated, they can be further subjected to a spatial frequency transform such as a wavelet transform. Note that a wavelet transform can consist of multiple stages or levels resulting in many spatial sub bands, as illustrated in FIG. 4. Though the term "wavelet" is used in this context, the method described herein is generic and can be applied to any analysis-synthesis structures using other well known transforms such as Quadrature Mirror filter banks, perfect reconstruction filters, quasi-perfect reconstruction filter banks, orthogonal and bi-orthogonal filter banks, etc. A filter bank can have a set of low pass and high pass filters and corresponding reconstruction filters. Well known texts explain the construction, such as P. P. Vaidyanathan, "Multirate Systems and Filter Banks", Prentice-Hall, Englewood Cliffs, N.J. 1993 and David S. Taubman and Michael W. Marcellin, "JPEG 2000: Image Compression, Fundamentals, Standards and Practice", Kluwer Academic Publishers, Norwell, Mass., 2002.

The conventional method of wavelet coding is to perform spatial wavelet transformations before the coding of the signals is done, and that approach is also used in the preferred embodiment of the present invention, though other embodiments need not operate in this manner. In this configuration, the input video is decomposed into component signals such as RGB using the component separator 110 illustrated in FIG. 1. The components are transformed into YUV by the well-known color space transformation. Each of the three resulting components in the YUV space is subjected to a spatial frequency analysis using a wavelet transform. The transformed signal is then split into coding blocks, which are treated as though they are independent. As before, the wavelet transform can lead to multiple sub bands. When divided into coding blocks, these sub bands are also naturally divided as "precincts" accordingly. Each precinct, now containing multiple sub bands is processed to create a "packet" of bit stream. This method detailed in JPEG 2000 standards, avoids the potential danger of "border" effects as in the first method. The signal extensions happen only once for the entire input. However, the computational load of using the entire image for wavelet transform and subsequent precinct based processing creates inter dependencies in the data and require more working memory for temporary storage and preclude careful division of processing load in a parallel processing environment. As a result, the implementation of JPEG 2000 coding scheme become more complex and difficult with ever increasing input resolutions. Even if it can be implemented with specialized hardware, it is quite unlikely that the implementation will be inexpensive, consume low power and have practical memory and delay limits.

Signal Extension to Avoid Seams

Certain details in the formation of sub bands are significant: A video frame is a finite two-dimensional entity. In order to make high quality analysis and synthesis system, the finite boundary of the input must be augmented by extending the signal outside the support. This is akin to the assumption of periodic extension assumed in the Fourier analysis. In the context of two-dimensional spatial frequency analysis, it is customary to relate the signal extension to the length of analysis filter used. Since the analysis and synthesis filter banks must cancel each other by construction, the signal passed through an analysis-synthesis system arrives at the output unaffected except for a phase delay. In some of the wavelet analysis-synthesis systems, even this phase delay can be eliminated by careful selection of transforms. In multi-stage analysis-synthesis systems, signal extension may be performed at each stage. Alternatively, a look-ahead signal extension can be done once and successive stages need not implement signal extensions. This is the preferred implementation.

Figure 3:
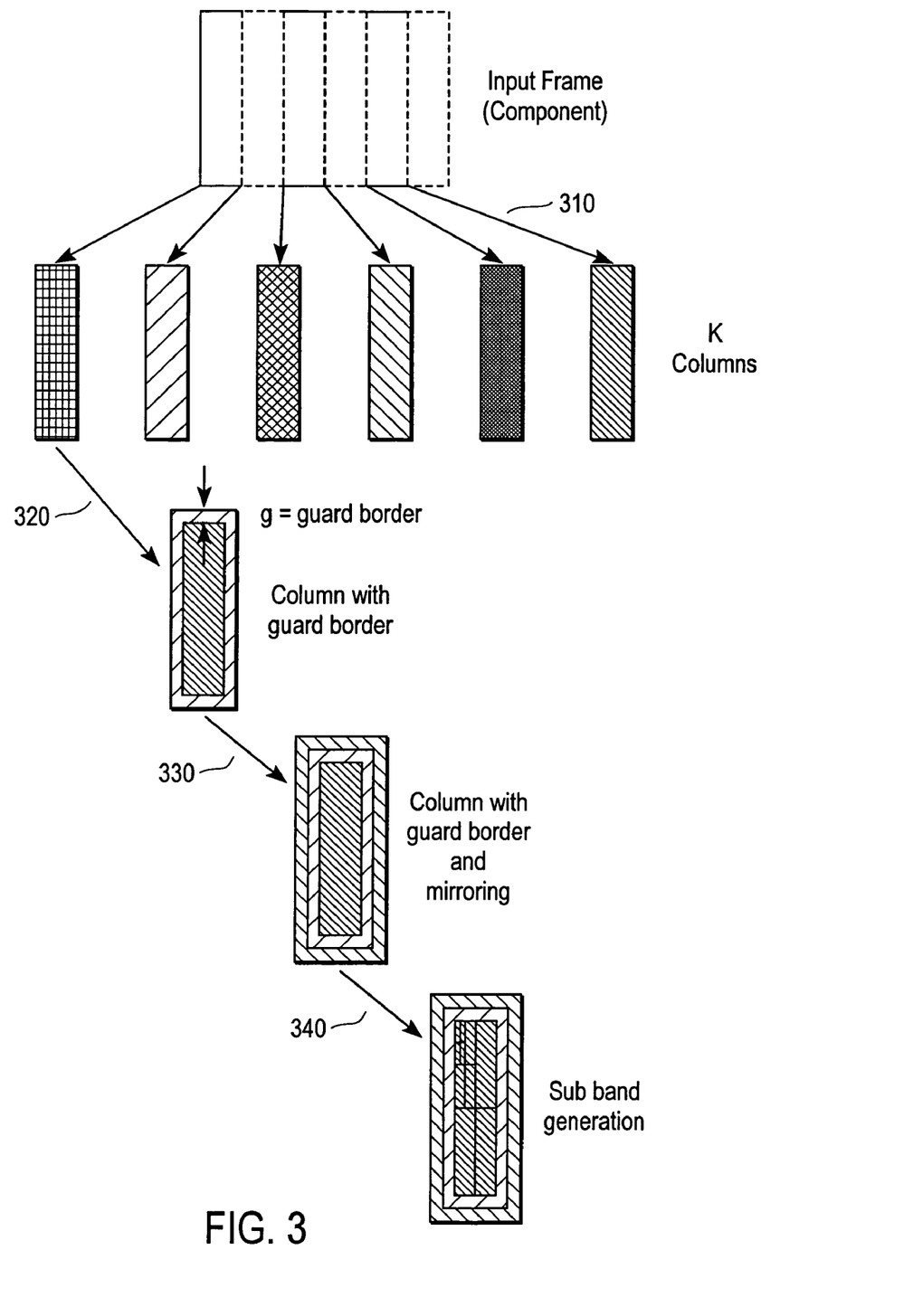
FIG. 3 illustrates a method of operating upon columns within the column splitter according to the present invention.

In the method described herein, the signal extension happens when the columns are processed to generate the multi-stage sub bands. As shown in FIG. 3, step 310 illustrates the formation of the columns as previously described. Thereafter, in step 320 is shown the inclusion of a guard band all along the boundary surrounds a column. The width of the guard band depends the number of stages of analysis and the type of analysis filter used. The signal in the guard band can be arbitrary. The actual column boundary is tracked when the sub bands are generated. To secure no degradation at the seams, a mirrored signal extension is carried out in step 330 at the outer extremity of guard band. In this way, the columns are forced to have no degradation at the seams when they are decoded and reconstructed at the receiver. Once each column has the guard border and mirror in place, sub-band generation step 340 can take place.

Multi Stage Pipelining with Minimal Hardware

Figure 4A:
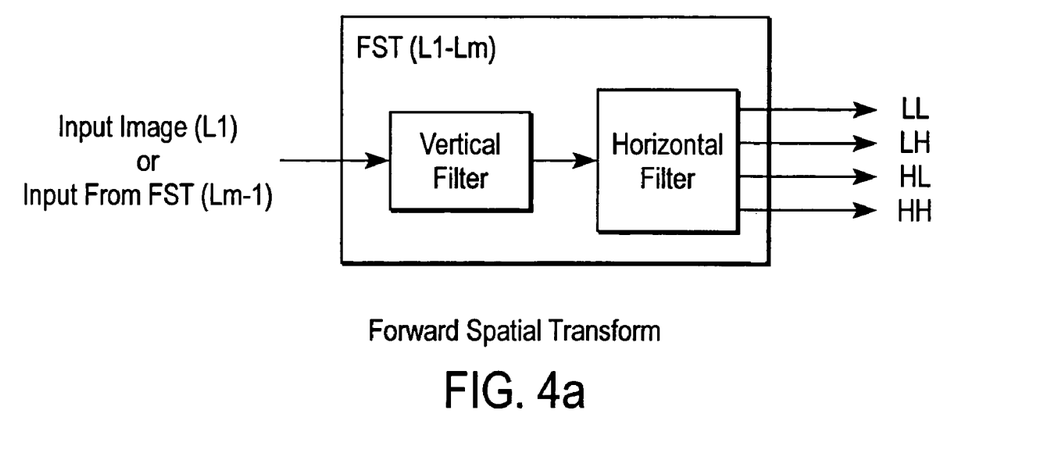
FIGS. 4(a)-4(d) illustrates the multi-stage pipelined architecture according to the present invention.
Figure 4B:
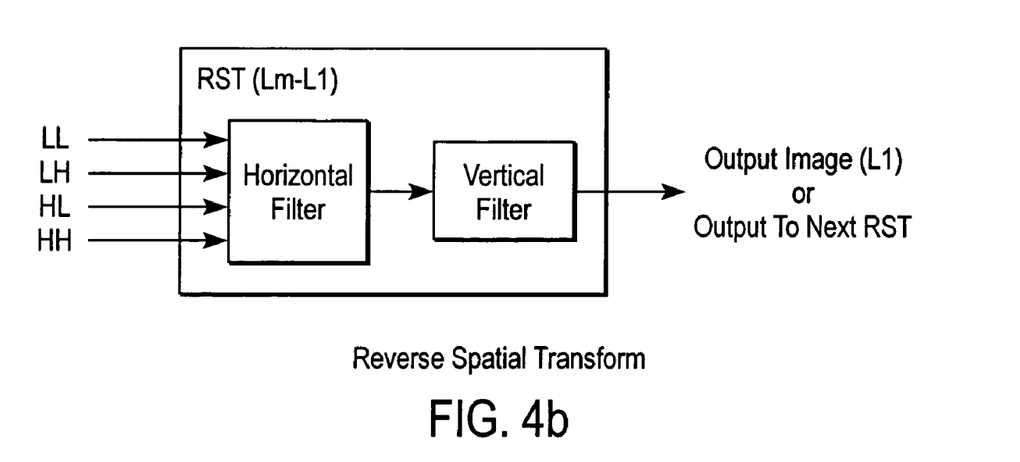
Figure 4C:
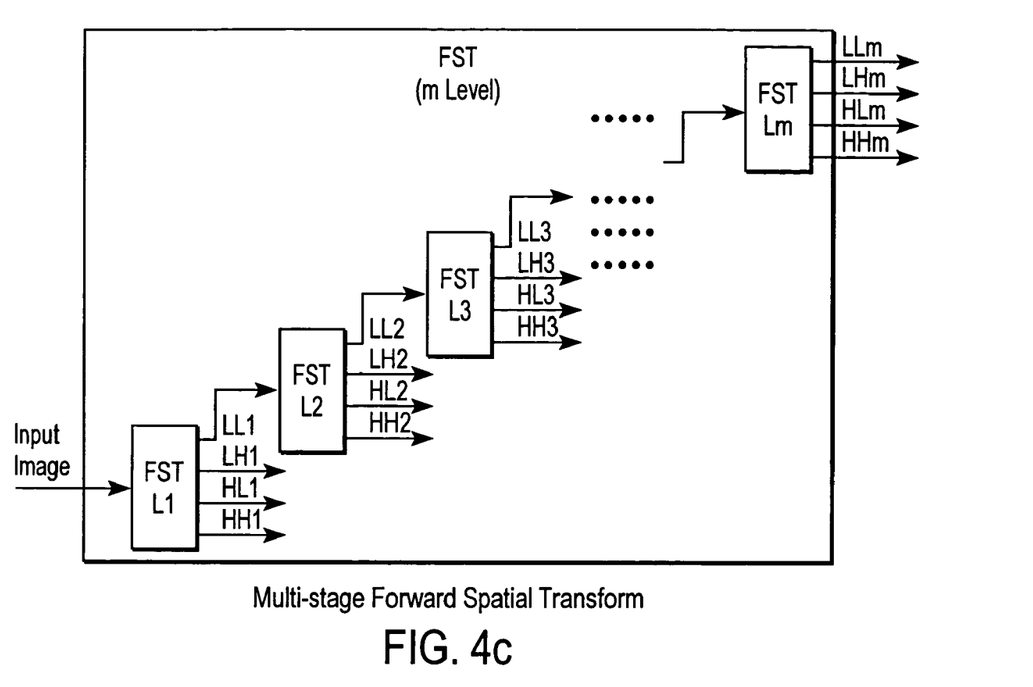
Figure 4D:
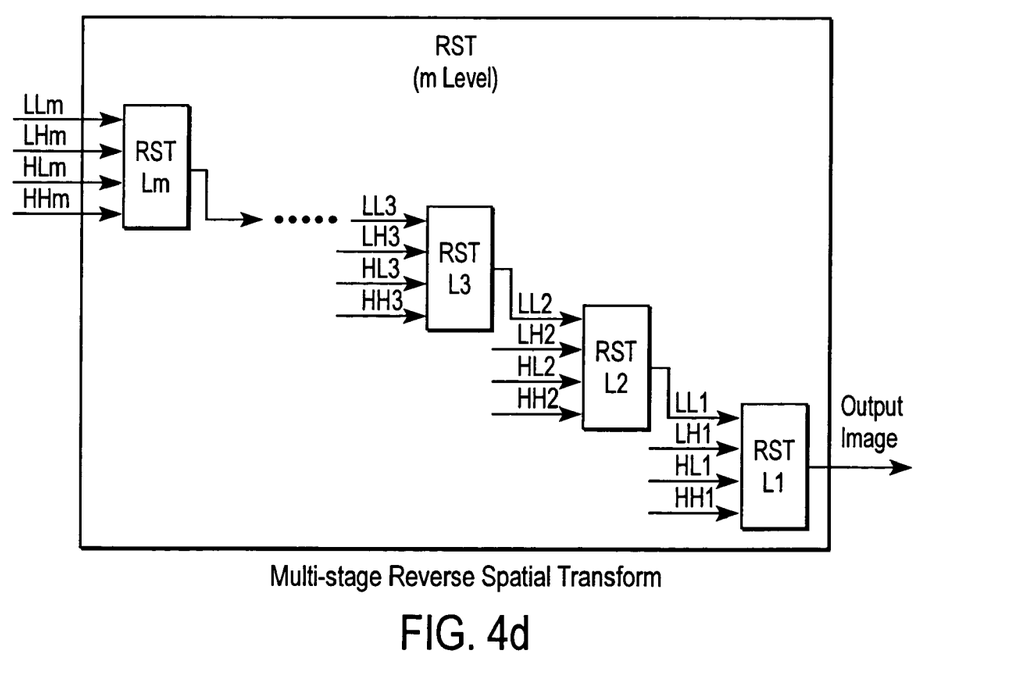

Another aspect of the system described herein is the multi-stage pipelined architecture. The two-dimensional multi-stage spatial transformation described is actually an iterative application of an individual stage. FIG. 4a represents an individual stage of forward spatial transform (FST). FIG. 4b represents an individual stage of reverse spatial transform (RST). Each stage is responsible for converting a two-dimensional array of image pixels into four sub band images. Since each stage has a low pass filter and a high pass filter, there are four possible combinations. If one applies a low pass filter in the horizontal direction and the vertical direction of the input array, a LL sub band is obtained. If a low pass filter in horizontal direction is followed by a high pass filter in the vertical direction, then a LH sub band is obtained. Following this logic, it is easy to see that four sub bands, LL, LH, HL, and HH are obtained. By their very construction, each of these sub bands has half the height and half the width of input image. In a multi stage implementation, the generated LL sub band is passed further into another stage of 2-D analysis. In this way, an m stage analysis system produces a total of 3m+1 sub bands. Refer to FIG. 4c. It is important to notice that each stage is a filter, which can be implemented incrementally by advancing a "moving stripe" through the input image. The transform stages can be pipelined with the last stage consuming the samples generated by the previous stage. The same arrangement is also feasible at the reconstruction or synthesis side as illustrated in FIG. 4d. Another advantage of pipelining is that the number of filters also can be cut down. More importantly, the system can be constructed to run at the highest speed possible with minimum possible system delay. In this construction, one set of low and high pass filters is used for horizontal filtering and another set for vertical filtering. This minimizes the hardware complexity enormously.

Filter Coefficient Word Length

Yet another detail is the implementation precision in terms of number of bits used in the filter implementation. Most of the perfect reconstruction, orthogonal and bi-orthogonal structures require floating point precision in order to avoid rounding error accumulation leading to limit cycle behaviors. In practice, however, finite precision arithmetic is always used, as the rounding errors in the arithmetic do not always emerge as visible artifacts for moderate coefficient word lengths. In a multi-stage implementation, the strategy of managing the error accumulation by having stage dependent word precision and look-ahead rounding error cancellation is used. The idea is to have a higher precision in the arithmetic in the beginning and reduce the precision successively for following stages. Since the signal can swing between minimum and maximum allowed levels, a multi-stage wavelet analysis system can easily accumulate rounding errors and show limit cycles. The strategy of the invention is to fine-tune the filter coefficient word length as a function of reconstructed error at the receiver.

Synchronous Generation of Sub Bands

Yet another detail is the synchronous generation of sub bands both in the analysis and synthesis stages by careful buffering and feed forward techniques. Observe that the sub bands are generated with columns as inputs. Since each column has a smaller width than the input, the complexity of the column-processing unit is much simpler. First a multi-stage wavelet transform has to be generated by accumulating the sub bands for the first stage. When there is enough data to start the second stage, the second stage analysis is started. When the buffer for the second stage contains sufficient data, the third stage begins. Similar operation happens at the receiver end too. The benefits of pipelining results in synchronous generation of sub bands. If the columns happen to have the same width, then all the columns will generate the sub bands in "lock" step. This enables one to have minimum encoding delay.

Column Processing

The column processors 130 illustrated in FIG. 1 perform a number of tasks:

a. Independent Units: Dividing the column into smaller units called Tiles or blocks: This creates signal division along the height of the input. Each tile is treated as an independent coding unit. This simplifies further processing of the transformed signals. Construction becomes simple, as there is small and finite limit for executing tile processes.

b. Quantization and Energy loss compensation: Quantizing the sub bands remove unwanted redundancies. The sub band signals, while providing a scale space separation, may contain unwanted precision and redundancies. These can be removed by using a separate quantizer for each sub band. One consequence of independent scalar quantization is that there is loss of energy in the high bands. The high bands usually contain signals that are considered to be "not important" to the visual quality of reconstructed video. However severe quantization of high bands creates reduced brightness in the reconstructed image. In a uniform quantizer, the reconstruction levels are usually set to the midpoint of the quantization interval. This setting is fine for many well-behaved statistical inputs. However by adding a step-size dependent increment to the reconstruction levels, one can actually equalize the brightness levels between the original and the compressed image. This technique balances the brightness in such as way that no visual dissimilarity can be perceived in a side-by-side comparison of the input and the reconstructed image.

c. Entropy Coding: A quantized sub band can further be compressed using a variety of entropy coding techniques. While sub band generation and quantization can be done in a synchronous manner, entropy coding introduces statistical variations in processing intervals. JPEG 2000 standard uses an arithmetic coder known as MQ coder, which works on the bit planes of a code block. By knowing the maximum processing time for any block, synchronous operation is still achievable.

d. Detecting temporal repetition: In a PC monitor application, the system is required to compress the PC screen and send it over to the receiver through a wired or wireless link. In this case, the image on a PC monitor is only very slowly changing compared to a scene captured from a camera. Most of movements happen when the user moves the mouse or scrolls or closes or opens an application window. Hence a greater utilization of transmission resources is obtained if one can detect repetition of frames. The lowest sub band is employed as a signature to detect temporal replication of frame. The lowest sub band is the smallest sub band in terms of number of pixels, yet it captures the essence of the input frame. When the input video frame remains constant, the coded lowest sub band contains the same coded bit stream at all frame instants. In this case, a decision to repeat the previous frame stored at the decoder is the best option. This decision to send or not to send a frame or parts of a frame can be made by comparing the coded bit stream of tiles or blocks. A refined approach is to use a function of the lowest sub-band as the signature.

Figure 5:
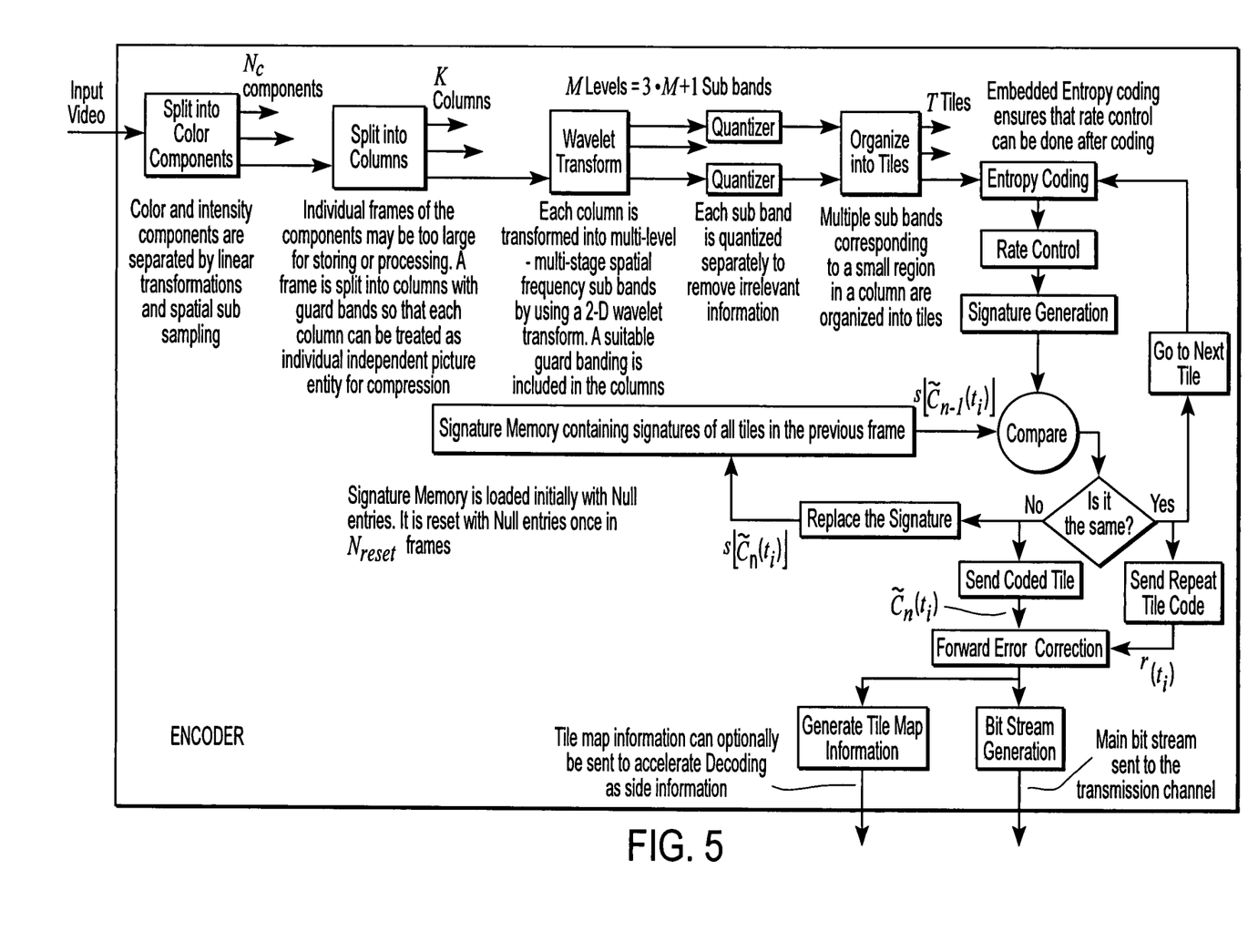
FIG. 5 illustrates an encoder according to the present invention that incorporates the various aspects of the transmitter functional diagram of FIG. 1.
Figure 6:
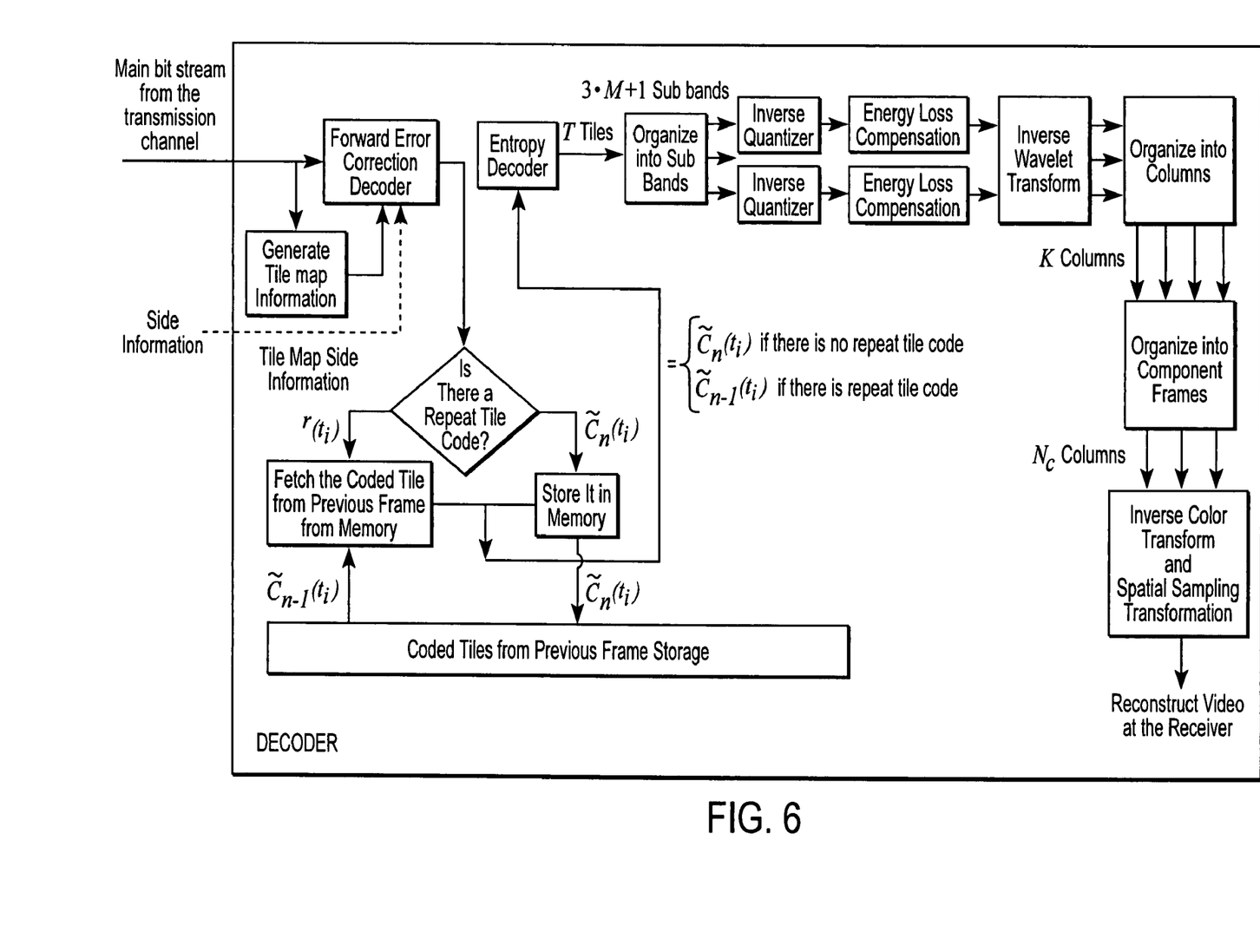
FIG. 6 illustrates an decoder according to the present invention that incorporates the various aspects of the receiver functional diagram of FIG. 2.

Combining all the functions described above, one can construct an encoder and a decoder as shown in FIGS. 5 and 6 respectively.

Encoder Structure

The algorithmic flow of the encoder is illustrated in FIG. 5, and takes in the high-resolution video input and splits into various $N_C$ components. Then each component is divided into K columns and processed independently. Each column has its own guard border as previously described with reference to FIG. 3.

Each column is then subjected to a M level wavelet transform yielding a total of $3 \cdot M+1$ sub bands. Each sub band is quantized separately and the quantized sub bands are organized as T tiles before performing entropy coding. The T tiles cover the input frame completely without any overlap or holes. Let us denote the entropy-coded tile $t_i$ of n-th frame as $C_n(t_i)$. Entropy coding removes redundancies in the quantized sub bands and organizes the output as an embedded bit stream. This means that by truncating the coded data, rate control can be achieved. This happens to be one of the main features of JPEG 2000 standard. After rate control, which may depend on the transmission channel state, the bit stream is denoted by $\tilde{C}_n(t_i)$. The encoder operates by testing if the tile has been sent in the previous frame as described below:

A Signature is generated by computing a function S of $\tilde{C}_n(t_i)$ as $S[\tilde{C}_n(t_i)]$. A signature guarantees that (a) its value is unique for each input argument with a very high probability, (b) it is easy to compute and (c) it takes very small amount of memory to store. As shown in FIG. 5, the encoder stores the signatures of all tiles for the previous frame in a small signature memory. The test is done by comparing the signatures $S[\tilde{C}_n(t_i)]$ and $S[\tilde{C}_{n-1}(t_i)]$. If the test determines that they are different, then the coded tile is transmitted to the receiver. At the same time, the signature memory is also updated with the new coded tile $\tilde{C}_n(t_i)$. Otherwise a repeat tile code $r(t_i)$ is sent to the receiver, which informs the receiver to repeat previously transmitted tile data. Before the data is transmitted, forward error correction using an algebraic or convolutional coder is also applied. The main bit stream generated has various headers for different tiles and they have to be parsed at the decoder. Parsing is a sequential process and can be slow. Bit stream parsing can be aided by sending tile map information as a side information data to the receiver.

The signature memory is reset at the start of transmission. It is also reset periodically to avoid error accumulation at the decoder. The period with which the reset happens is related to the effective compression ratio derived later. This operation has the same effect as an I-frame in a MPEG coding scheme, though this is very different in the context of the encoder described herein.

Decoder Structure

The algorithmic flow of the decoder is illustrated in FIG. 6. It receives the main bit stream and generates the tile map before performing error correction decoding. It can be optionally aided by the side information sent by the transmitter. The tile map generation can be implemented by using a microprocessor to sort out the bit stream headers and parse the tile data.

At the input, the decoder checks for the presence of the repeat tile code $r(t_i)$. If it is present, then a corresponding coded tile data from the previous frame is sent to the entropy decoder. Otherwise the newly received data is first stored in the local memory and also sent to the entropy decoder. The output from the entropy decoder is organized into sub bands, which are reconstructed using appropriate inverse quantizers and energy-loss compensation units. Then columns are assembled to form component frames and then video output reconstruction.

Compression Efficiency

Let us assume that the encoder signature memory is reset once in every $N_{reset}$ frames. Let the frame size before compression be $$B_{original} \text{bytes} = \frac{XYN_cZ_c}{8}.$$

Let the average multiplier factor for transmitted tiles be C, i.e., only $B_{original} \cdot C$ bytes are transmitted when there is no repeat tiles. Let the probability of sending a repeat tile code be p. Then the data transmitted=$(1-P) \cdot B_{original} \cdot C \cdot (N_{reset}-1) + B_{original} \cdot C = B_{original} \cdot C[1+(1-p) \cdot (N_{reset}-1)]$. The data contained in the original sequence is $B_{original} \cdot N_{reset}$. The resulting effective compression ratio $$\text{ratio} = \frac{B_{original} \cdot N_{reset}}{B_{original} \cdot C\{1+(1-p) \cdot (N_{reset}-1)\}} = \frac{N_{reset}}{C\{1+(1-p) \cdot (N_{reset}-1)\}}.$$

When $p \rightarrow 1$, the effective compression ratio becomes $$\frac{N_{reset}}{C}.$$

On the other hand, when $p \rightarrow 0$, the effective compression ratio is just 1/C. By having the tile repetition strategy, the effective compression can be multiplied by as much as $N_{reset}$. This will be the case when static frames such as those from a PC screen are transmitted. This means that it is possible to have the same quality as governed by the compression factor C, yet manage to boost the effective compression ratio by a factor of $$\frac{N_{reset}}{C\{1+(1-p) \cdot (N_{reset}-1)\}}.$$

Formatting Decoded Image to Display Size

Figure 7:
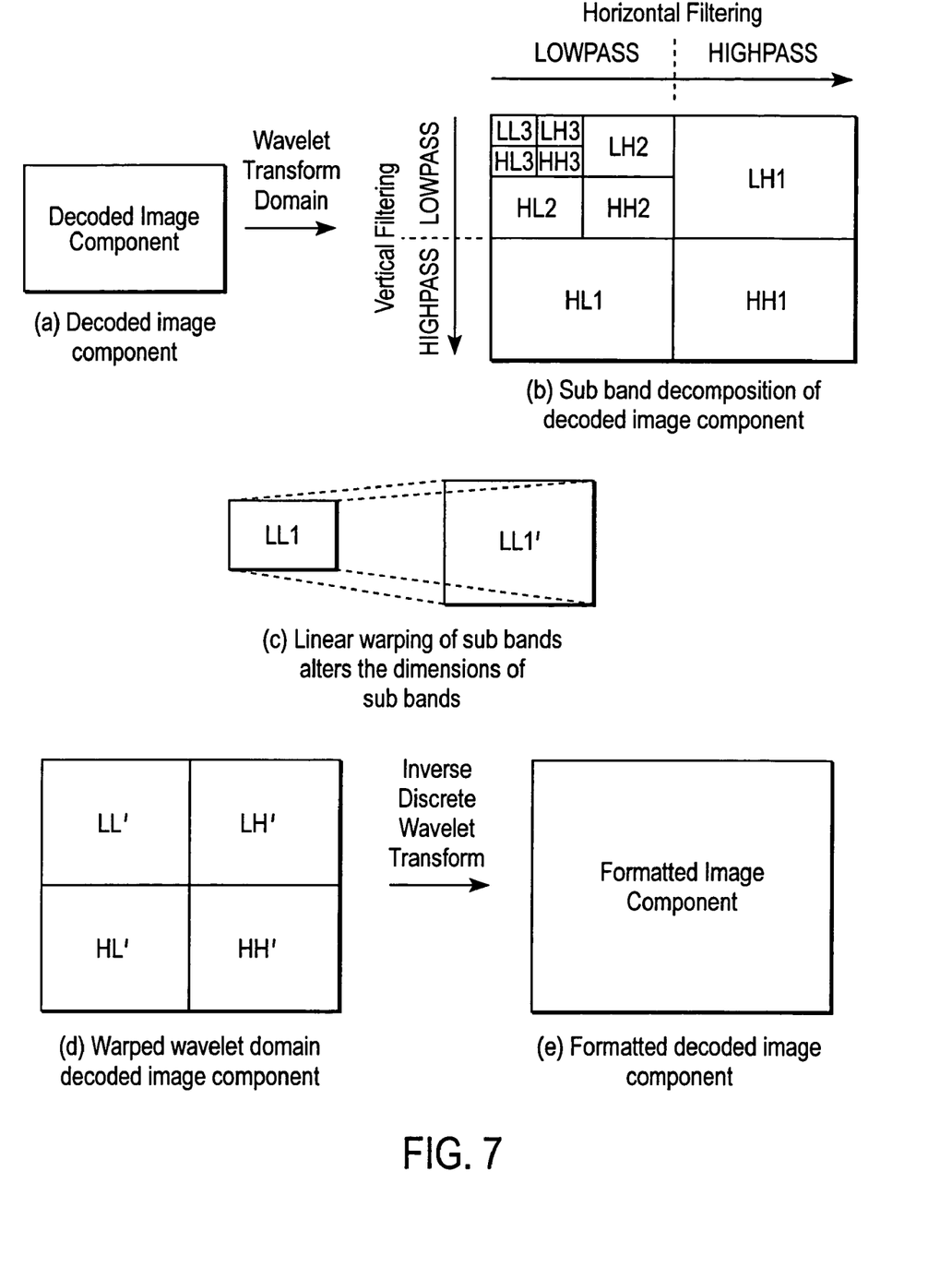
FIGS. 7(a)-7(e) illustrate the method used by the decoder in formatting and scaling of the decoded image to fit an arbitrary display screen with a different pixel resolution.

In many situations, the display at the receiver side may not have the same number of pixels as in the decoded image. In this case, it is necessary to reformat the decoded image to fit the display. This process is illustrated in FIG. 7.

The decoded image component, before it is converted from the wavelet domain to pixel domain, is shown in FIG. 7(b). It is customary to represent the different sub bands in the vertical and horizontal dimensions as regions in the spatial spectral domain. FIG. 7(b) shows a 3 level sub band decomposition showing 10 sub bands HH1, LH1, HL1, . . . LL3. The spatial sizes of the sub bands also show the dyadic nature of wavelet transform. Since the coded image is transmitted in the wavelet domain, it is advantageous to perform formatting and scaling in the wavelet domain.

Let the coded image component have a size of w pixels horizontally and h pixels vertically. Then the first level wavelet transform yields sub bands LL1, LH1, HL1, and HH1 each having (w/2) pixels horizontally and (h/2) pixels vertically. If the display screen has the resolution w'×h' pixels, then it is desirable to do the scaling and formatting in the wavelet domain using the first level sub bands LL1, LH1, HL1, and HH1 or using second and more levels of sub bands. In the diagram, the method is illustrated using the first level sub bands.

Each of the sub bands LL1, LH1, HL1, and HH1 are linearly warped to have dimensions (w'/2) horizontally and (h'/2) vertically. As shown in FIG. 7(c), each sub band in a single level or multiple levels is warped to the desired spatial dimension by linear transformation. A variety of linear transforms are available for this purpose, see, for example, Jonas Gomes, Lucia Darsa, Bruno Costa, and Luiz Velho, "Warping and Morphing of Graphical Objects", Morgan Kaufmann Publishers, San Francisco, Calif., 1999 and A. Murat Teklap, "Digital Video Processing", Prentice-Hall PTR, Upper Saddle River, N.J., 1995. Since the operation is performed in the frequency domain, special care must be taken to ensure appropriate guard borders are constituted. FIG. 7(d) shows the results after warping. At this stage, the formatted component is ready for inverse DWT to the final formatted dimensions. The kernels used in the warping and scaling process could be any of the kernels normally used. FIG. 7(e) shows the results of the formatting. In this way, the decoder can fit its output to any available display screen size resolutions.

Modifications and variations of the preferred embodiment will be readily apparent to those skilled in the art. Such variations are within the scope of the present invention as defined by the appended claims.

The invention claimed is:

1. A method of operating upon a sequence of data frames that occur at a predetermined frame rate for transmission between an encoder and a decoder, each of the data frames including a plurality of luminance components and a plurality of chrominance components, the plurality of components provided within pixel data that is spatially identifiable in horizontal and vertical position, comprising the steps of:

inputting the plurality of data frames into the encoder;

separating, using the encoder, for each frame, the frame of pixel data into a separate data groups, each separate data group corresponding to one of the color and intensity components, and each separate data group maintaining a spatial relationship of the pixel data associated with the component to the frame;

for each separate data group, splitting, using the encoder, the data group into a plurality of columns each containing a corresponding column of the pixel data, each column corresponding to a stripe of the frame and having an edge, such that the plurality of columns together account for the entire area of the frame with a part of the edge of adjacent columns sharing a common border;

for each of the plurality of columns in each of the separate data groups, independently encoding, using the encoder, the pixel data for each of the columns to obtain a plurality of encoded columns containing encoded and compressed column data, the step of independently encoding including the steps of inserting, using the encoder, a guard border around all edges of the column to obtain a guard banded column that assists in eliminating artifacts when reconstituting the frame by retaining edge information of the column; and operating, using the encoder, upon the guard banded column to obtain the encoded and compressed column data for the encoded column, the step of operating including the steps of:

transforming, using the encoder, the guard banded column into a spatial frequency domain using a wavelet transform, the guard banded column containing a plurality of different frequency bands; and separately compressing, using the encoder, each of the plurality of different frequency bands by eliminating precision within data therein to obtain a plurality of compressed frequency bands, the step of compressing eliminating precision in certain higher frequency ones of the different frequency bands than other lower frequency ones of the different frequency bands; and assembling, using the encoder, for transmission each of the encoded columns for each separate data group for each of the plurality of frames to obtain transmission ready data.

2. The method according to claim 1 wherein the step of operating further includes, after the step of separately compressing, the steps of, using the encoder:

partitioning some of the separate data groups into a plurality of independent tiles;

creating a digital signature associated with each of the plurality of independent tiles;

comparing the digital signature in each of the plurality of independent tiles associated with a present frame with the digital signature in each of the plurality of independent tiles associated with the immediately previous frame to determine matches;

substituting an identity marker for each independent tile where the match is determined.

3. The method according to claim 1 wherein the digital signature is created from the lowest sub-band.

4. The method according to claim 1 wherein each of the plurality of different frequency bands is separately compressed in the step of separately compressing using a distinct hardware module.

5. The method according to claim 1 wherein each of the guard borders is obtained by replicating certain of the column data located at the edge of each of the columns.

6. The method according to claim 5 wherein the step of inserting a guard border is performed using a look-ahead signal extension process in order to assist in removing undesired artifacts.

7. The method according to claim 1 wherein the step of transforming the guard banded column into the spatial frequency domain results in an array of sub-bands, the array of sub-bands including high-pass sub-bands and low-pass sub-bands; and further includes:

transforming each of the sub-bands in the array of sub-bands into a further array of further sub-bands, the further array of further sub-bands including further high-pass sub-bands and further low-pass sub-bands.

8. The method according to claim 7 further including the step of transforming each of the further sub-bands in the further array of further sub-bands into a another array of other sub-bands, the another array of other sub-bands including other high-pass sub-bands and other low-pass sub-bands.

9. The method according to claim 8 wherein each of the steps of transforming are performed by a separate pipeline stage, and each of the different components have a different pipeline, thereby resulting in a multi-pipeline, multi-stage system.

10. The method according to claim 9 wherein each of the steps of transforming include one set of high and low pass horizontal filters, and one set of high and low pass vertical filters.

11. The method according to claim 7 wherein a higher word length precision is used in the step of transforming the guard band column than is used in the step of transforming each of the sub-bands.

12. The method according to claim 7 wherein:

the step of transforming the guard band column allows for the synchronous generation of each of the sub-bands; and the step of transforming each of the sub-bands allows for the synchronous generation of each of the further sub-bands.

13. The method according to claim 12 wherein the step of operating uses minimal memory and hardware resources.

14. The method according to claim 12 wherein the step of operating allows for parallel operations on large amounts of picture data.

15. The method according to claim 12 wherein the step of operating allows for parallel operations on frames of any size, by independently operating the columns.

16. The method of claim 1 wherein the step of independently encoding operates upon at least some of the columns in parallel.

17. The method according to claim 16 further including the steps of:

transmitting to a decoder the transmission ready data at a rate sufficient to allow for presentation of decoded frames at the predetermined frame rate;

receiving each of the plurality of encoded columns at the decoder; and reconstituting the frame, the step of reconstituting including the steps of:

decoding, using the decoder, each of the plurality of encoded columns to obtain a plurality of decoded columns; and stitching together, using the decoder, at each common border the plurality of decoded columns to reconstitute the frame.

18. The method according to claim 17 wherein the step of reconstituting the frame includes, for each of the components, equalizing a brightness level to compensate for any loss of energy in high-band components.

19. The method according to claim 1 wherein the step of separating is adaptable to operate upon any resolution frame, and each of the different plurality of columns includes a different module that operates upon the column data associated with each column.

* * * * *